United States Patent
Shigematsu

(10) Patent No.: US 11,181,883 B2
(45) Date of Patent: Nov. 23, 2021

(54) PROCESSING APPARATUS AND PROCESSING METHOD

(71) Applicant: DISCO CORPORATION, Tokyo (JP)

(72) Inventor: Koichi Shigematsu, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 355 days.

(21) Appl. No.: 15/603,727

(22) Filed: May 24, 2017

(65) Prior Publication Data
US 2017/0343979 A1    Nov. 30, 2017

(30) Foreign Application Priority Data
May 31, 2016    (JP) .............................. JP2016-108601

(51) Int. Cl.
*G05B 19/401* (2006.01)
*B23K 101/40* (2006.01)
(Continued)

(52) U.S. Cl.
CPC ............ *G05B 19/402* (2013.01); *B23K 26/53* (2015.10); *G05B 19/401* (2013.01);
(Continued)

(58) Field of Classification Search
CPC ................ G05B 19/402; G05B 19/401; G05B 2219/37559; G05B 2219/34465; G05B 2219/50064; B23K 26/53; B23K 2101/40; H01L 21/67011; H01L 21/67155; H01L 21/67242; H01L 21/67276; H01L 22/12; H01L 21/268; H01L 21/68
See application file for complete search history.

(56) References Cited

U.S. PATENT DOCUMENTS

| 5,898,478 A | * | 4/1999 | Yim | .................... G03F 7/70633 355/53 |
| 6,556,949 B1 | * | 4/2003 | Lyon | ..................... G05B 15/02 702/182 |

(Continued)

FOREIGN PATENT DOCUMENTS

| JP | H05291225 A | * | 11/1993 |
| JP | 07236989 A | | 9/1995 |

(Continued)

OTHER PUBLICATIONS

Machine translation of JPH05291225A (Year: 1993).*

*Primary Examiner* — Kenneth M Lo
*Assistant Examiner* — Istiaque Ahmed
(74) *Attorney, Agent, or Firm* — Greer Burns & Crain Ltd.

(57) ABSTRACT

Disclosed herein is a processing apparatus including a processing unit, alignment unit, and controller. The controller includes a reference program storing section previously storing a reference program for use in processing a predetermined workpiece, a reference result recording section for rating the result of processing performed to the predetermined workpiece by the processing unit according to the reference program and then recording a resultant rating point as a processing reference result, and an actual result calculating section for rating the result of processing performed to substantially the same workpiece as the predetermined workpiece by the processing unit according to the reference program.

4 Claims, 4 Drawing Sheets

(51) Int. Cl.
*G05B 19/402* (2006.01)
*B23K 26/53* (2014.01)

(52) U.S. Cl.
CPC ............. *B23K 2101/40* (2018.08); *G05B 2219/34465* (2013.01); *G05B 2219/37559* (2013.01); *G05B 2219/50064* (2013.01)

(56) References Cited

U.S. PATENT DOCUMENTS

| | | | | |
|---|---|---|---|---|
| 2002/0023329 | A1* | 2/2002 | Nulman | G05B 19/4183 29/25.01 |
| 2003/0202178 | A1* | 10/2003 | Tsuji | G01N 21/9503 356/237.2 |
| 2008/0106714 | A1* | 5/2008 | Okita | G03F 7/70633 355/53 |
| 2008/0112780 | A1* | 5/2008 | Matano | H01L 21/67167 414/217.1 |
| 2012/0327415 | A1* | 12/2012 | Ito | G01N 21/21 356/369 |
| 2013/0074326 | A1* | 3/2013 | Uekawa | H05K 13/08 29/739 |
| 2013/0129189 | A1* | 5/2013 | Wu | G06T 7/001 382/151 |
| 2014/0353598 | A1* | 12/2014 | Jeong | H01L 51/0012 257/40 |
| 2016/0158978 | A1* | 6/2016 | Aihara | B29C 59/02 264/40.5 |
| 2016/0343122 | A1* | 11/2016 | Jing | H04N 5/372 |
| 2016/0343123 | A1* | 11/2016 | Jing | G01N 23/083 |

FOREIGN PATENT DOCUMENTS

| | | |
|---|---|---|
| JP | 2002228495 A | 8/2002 |
| JP | 2012232316 A | 11/2012 |
| JP | 201426436 A | 2/2014 |
| JP | 2015-097048 | 5/2015 |
| WO | 2015046090 A1 | 4/2015 |

* cited by examiner

FIG.4
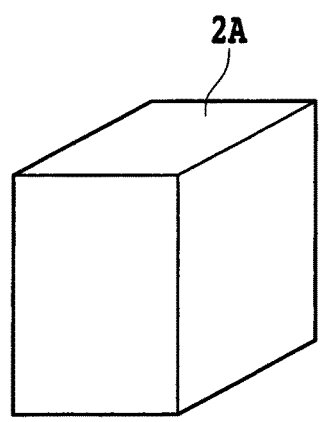
2A
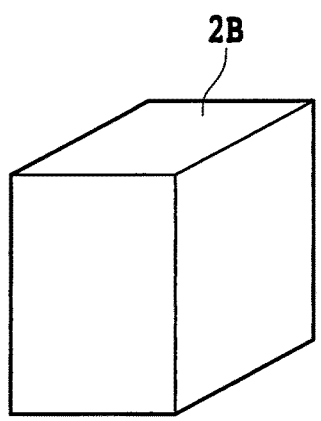
2B
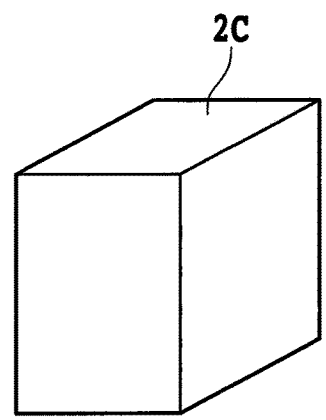
2C
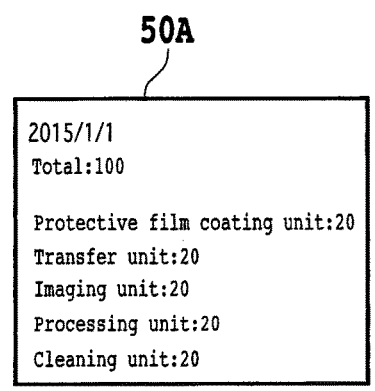
50A
2015/1/1
Total:100
Protective film coating unit:20
Transfer unit:20
Imaging unit:20
Processing unit:20
Cleaning unit:20
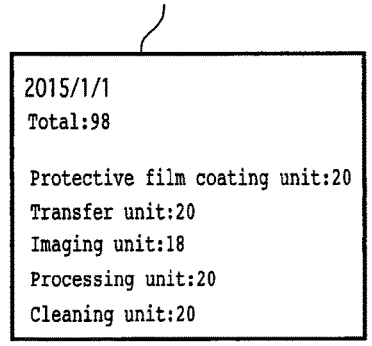
50B
2015/1/1
Total:98
Protective film coating unit:20
Transfer unit:20
Imaging unit:18
Processing unit:20
Cleaning unit:20
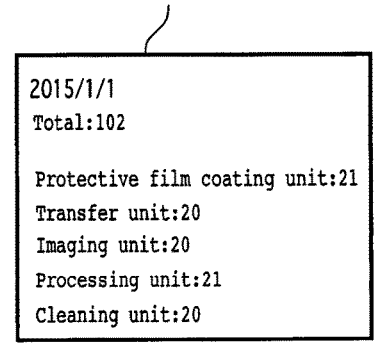
50C
2015/1/1
Total:102
Protective film coating unit:21
Transfer unit:20
Imaging unit:20
Processing unit:21
Cleaning unit:20

PROCESSING APPARATUS AND PROCESSING METHOD

BACKGROUND OF THE INVENTION

Field of the Invention

The present invention relates to a processing apparatus and a processing method for processing a workpiece such as a semiconductor wafer.

Description of the Related Art

For example, a processing apparatus such as a laser processing apparatus for performing laser processing to a workpiece includes a processing unit for processing the workpiece, a transfer unit for transferring the workpiece to the processing unit, an alignment unit for making the alignment between the workpiece and the processing unit, a cleaning unit for cleaning the workpiece, and a coating unit for coating the workpiece with a protective film. Thusly, the processing apparatus includes a plurality of units, wherein each unit is composed of a plurality of parts. Each unit is deteriorated with the use or aging of the processing apparatus. Accordingly, many processing apparatus makers recommend a periodical inspection for each unit, for example.

SUMMARY OF THE INVENTION

However, there is a problem such that a large amount of man-hours is required in periodically inspecting each unit about many items. Further, although each unit is not abnormal in the present periodical inspection, there is a possibility that each unit may be troubled or broken before the next periodical inspection. Further, whether or not a periodical inspection is performed is left to a user. Accordingly, there is a case that a user not performing a periodical inspection may notice a deterioration in each unit only after each unit has been troubled or broken. From this point of view, there has been desired a processing apparatus and a processing method which can recognize the condition of each unit without the need for performing a periodical inspection.

It is therefore an object of the present invention to provide a processing apparatus and a processing method which can simply recognize the condition of each unit of the processing apparatus.

In accordance with an aspect of the present invention, there is provided a processing apparatus including processing means for processing a workpiece, alignment means having an imaging camera for performing alignment to the workpiece to be processed by the processing means, and control means for controlling the processing means and the alignment means. The control means includes a reference program storing section previously storing a reference program for use in processing a predetermined workpiece, a reference result recording section for rating the result of alignment performed to the predetermined workpiece by the alignment means according to the reference program and then recording a resultant rating point as an alignment reference result when the alignment means is not abnormal, and also for rating the result of processing performed to the predetermined workpiece by the processing means according to the reference program and then recording a resultant rating point as a processing reference result when the processing means is not abnormal, and an actual result calculating section for rating the result of alignment performed to substantially the same workpiece as the predetermined workpiece by the alignment means according to the reference program and also rating the result of processing performed to substantially the same workpiece as the predetermined workpiece by the processing means according to the reference program.

Preferably, the control means further includes an abnormality determining section for determining that the alignment means is abnormal when the result of alignment rated by the actual result calculating section is lower by predetermined points than the alignment reference result and also determining that the processing means is abnormal when the result of processing rated by the actual result calculating section is lower by predetermined points than the processing reference result.

In accordance with another aspect of the present invention, there is provided a processing method for processing a workpiece by using a processing apparatus including processing means for processing the workpiece, alignment means having an imaging camera for performing alignment to the workpiece to be processed by the processing means, and control means for controlling the processing means and the alignment means. The processing method includes a predetermined workpiece preparing step of preparing a predetermined workpiece, a reference program storing step of storing a reference program for processing the predetermined workpiece by using the processing apparatus, a reference result recording step of rating the result of alignment performed to the predetermined workpiece by the alignment means according to the reference program and then recording a resultant rating point as an alignment reference result when the alignment means is not abnormal, and also of rating the result of processing performed to the predetermined workpiece by the processing means according to the reference program and then recording a resultant rating point as a processing reference result when the processing means is not abnormal, a workpiece processing step of performing alignment to substantially the same workpiece as the predetermined workpiece according to the reference program by using the alignment means and performing processing to substantially the same workpiece as the predetermined workpiece according to the reference program by using the processing means, after performing the predetermined workpiece preparing step, the reference program storing step, and the reference result recording step, and an actual result calculating step of rating the result of alignment performed to substantially the same workpiece as the predetermined workpiece in the workpiece processing step and also rating the result of processing performed to substantially the same workpiece as the predetermined workpiece in the workpiece processing step.

Preferably, the processing method further includes an alignment means abnormality determining step of determining that the alignment means is abnormal when the result of alignment rated in the actual result calculating step is lower by predetermined points than the alignment reference result, and a processing means abnormality determining step of determining that the processing means is abnormal when the result of processing rated in the actual result calculating step is lower by predetermined points than the processing reference result.

According to the present invention, the actual result calculating section operates to rate the result of alignment performed to substantially the same workpiece as the predetermined workpiece according to the reference program and also to rate the result of processing performed to substantially the same workpiece as the predetermined workpiece according to the reference program. Accordingly, the condition of the alignment means and the condition of the processing means can be quantitatively recognized.

The alignment reference result and the processing reference result recorded in the reference result recording section are compared with the alignment result and the processing result calculated in the actual result calculating section, respectively. Accordingly, the user can notice a deterioration in the alignment means and the processing means before the alignment means and the processing means are troubled or broken. Accordingly, the trouble or break of the alignment means and the processing means can be prevented by suitably performing the maintenance therefor. As a result, the necessity of a periodical inspection for the processing apparatus can be eliminated to thereby reduce the amount of man-hours.

The result of processing performed to the predetermined workpiece according to the reference program is rated as points, so that the condition of the alignment means and the condition of the processing means can be recognized during the actual operation of the processing apparatus.

In the case that the control means further includes the abnormality determining section mentioned above, any abnormality is determined by the control means in the processing apparatus. That is, the user is not required to determine any abnormality in the processing apparatus. The abnormality can be determined without depending upon the skill level of the user, so that the maintenance or parts replacement can be performed with suitable timing.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 4 is a schematic diagram showing a condition that each unit included in different laser processing apparatuses is rated on the same date.

DETAILED DESCRIPTION OF THE PREFERRED EMBODIMENT

Figure 1:
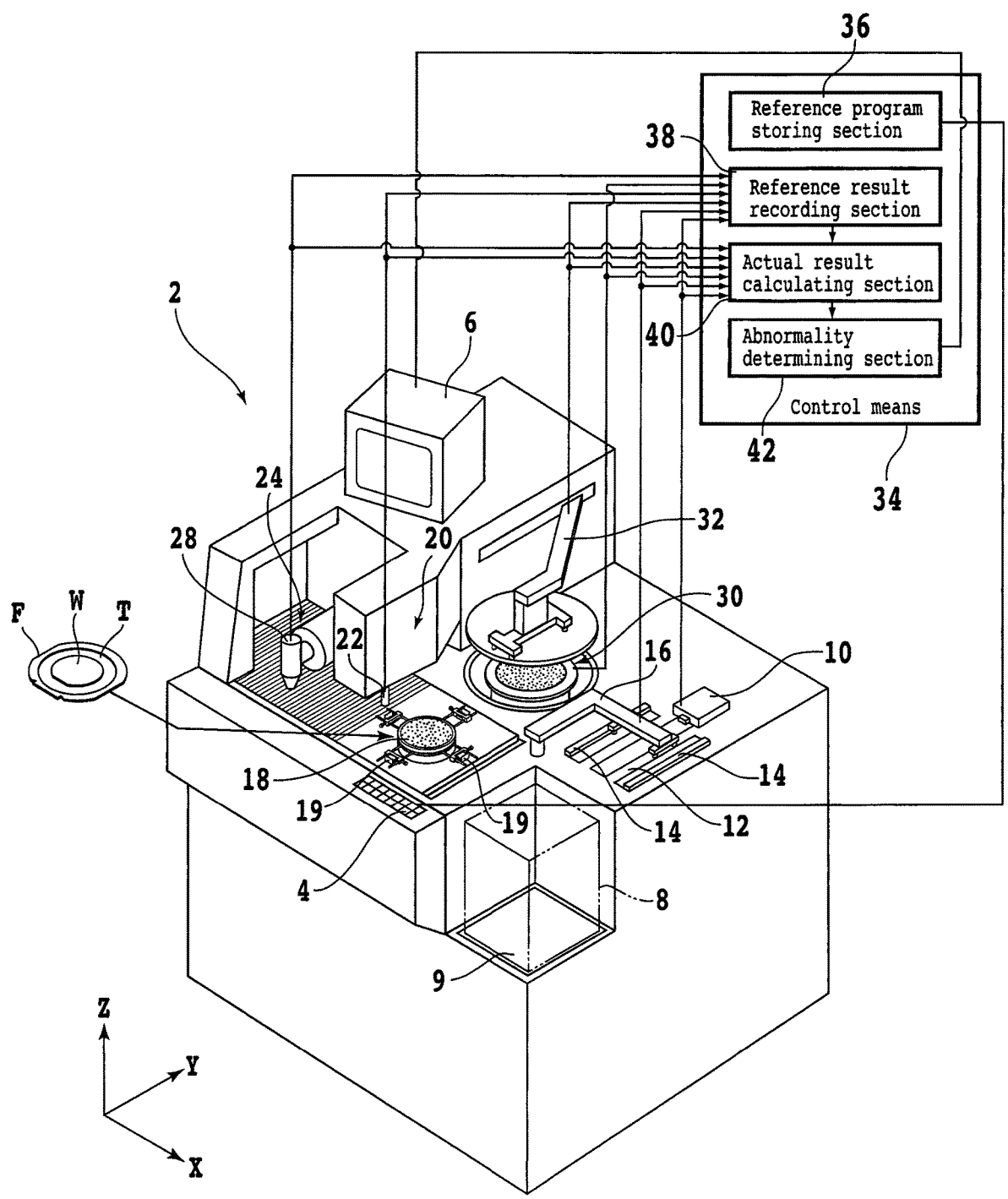
FIG. 1 is a perspective view of a laser processing apparatus including control means according to the present invention.

A preferred embodiment of the present invention will now be described in detail with reference to the drawings. Referring to FIG. 1, there is shown a perspective view of a laser processing apparatus as an example of the processing apparatus including control means according to the present invention. A laser processing apparatus 2 includes an operation panel 4 for allowing an operator to input instructions such as processing conditions to the laser processing apparatus 2. The operation panel 4 is provided at a front end portion of the laser processing apparatus 2. The laser processing apparatus 2 includes display means 6 such as cathode-ray tube (CRT) for displaying a guide screen to the operator or an image obtained by an imaging unit (imaging means) to be hereinafter described. The display means 6 is provided at an upper portion of the laser processing apparatus 2.

Figure 2:
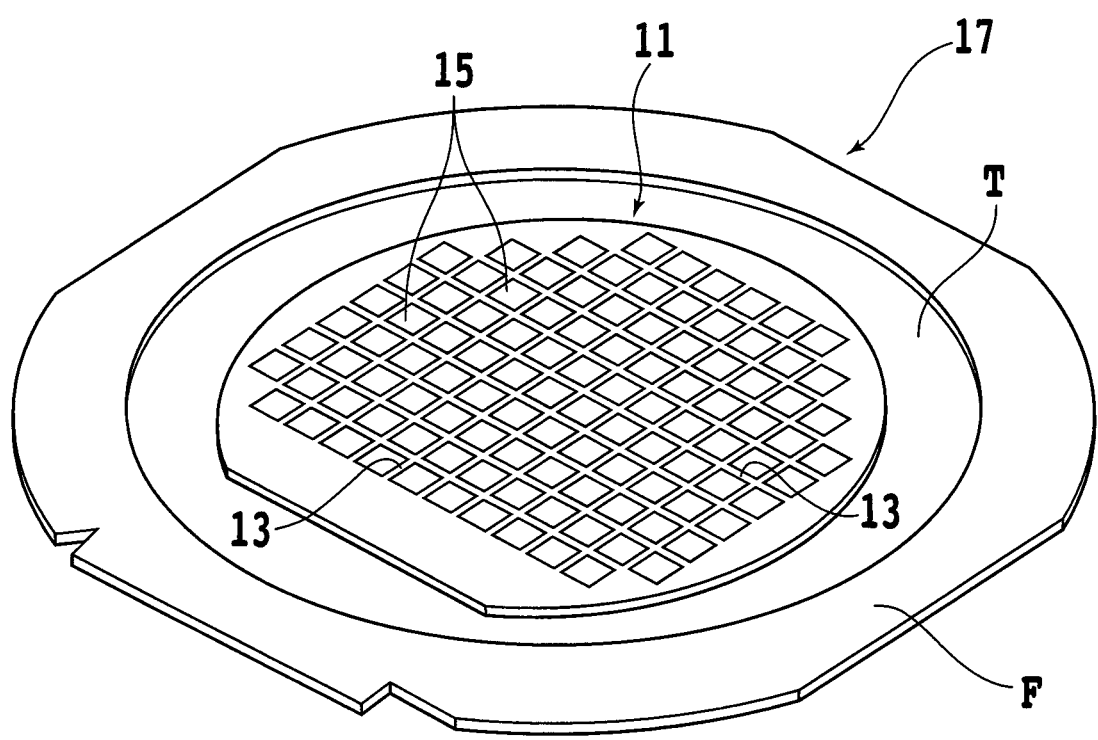
FIG. 2 is a perspective view of a frame unit.

Referring to FIG. 2, a semiconductor wafer 11 as a workpiece is shown. The semiconductor wafer 11 will be hereinafter referred to also simply as the wafer 11. A plurality of crossing division lines (streets) 13 are formed on the front side of the wafer 11 to thereby define a plurality of separate regions where a plurality of devices 15 are individually formed. The back side of the wafer 11 is attached to a dicing tape T as an adhesive tape at its central portion. The peripheral portion of the dicing tape T is attached to an annular frame F. Accordingly, the wafer 11 is supported through the dicing tape T to the annular frame F, thereby forming a frame unit 17. Thus, the wafer 11 is handled in the form of the frame unit 17. A plurality of (e.g., 25) such frame units 17 are stored in a wafer cassette 8 shown in FIG. 1. The wafer cassette 8 is adapted to be placed on a vertically movable cassette elevator 9 shown in FIG. 1. The cassette elevator 9 is provided at a front portion of the laser processing apparatus 2.

The laser processing apparatus 2 includes a handling unit (handling means) 10 for taking one of the plural frame units 17 (the plural wafers 11) out of the wafer cassette 8 before laser processing and returning the frame unit 17 (the wafer 11) into the wafer cassette 8 after laser processing. The handling unit 10 is movably provided on the rear side of the wafer cassette 8 placed on the cassette elevator 9. A temporary setting area 12 is defined between the wafer cassette 8 and the handling unit 10. The temporary setting area 12 is an area where the frame unit 17 is temporarily set. In the temporary setting area 12, a positioning unit (positioning means) 14 is provided to set the frame unit 17 in a given position. The positioning unit 14 is configured by a pair of parallel bars movable toward and away from each other.

Reference numeral 30 denotes a coating and cleaning apparatus including a protective film coating unit and a cleaning unit. The coating unit functions to coat the front side of the wafer 11 with a protective film before laser processing. The cleaning unit functions to clean the wafer 11 after laser processing and thereby remove the protective film. A first transfer unit (first transfer means) 16 is provided in the vicinity of the temporary setting area 12. The first transfer unit 16 has a swing arm for holding the annular frame F of the frame unit 17 under suction and transferring the frame unit 17 (the wafer 11). The swing arm is rotatable about a vertical axis.

The frame unit 17 is transferred from the temporary setting area 12 to the coating and cleaning apparatus 30 by operating the first transfer unit 16 before laser processing. In the coating and cleaning apparatus 30, a protective film is formed on the front side (work surface) of the wafer 11, so as to protect the devices 15. After forming the protective film on the front side of the wafer 11, the frame unit 17 is transferred from the coating and cleaning apparatus 30 to a chuck table 18 by operating the first transfer unit 16. The chuck table 18 is provided on the front side of the coating and cleaning apparatus 30 at a home position shown in FIG. 1. The wafer 11 of the frame unit 17 is held through the dicing tape T on the chuck table 18 under suction, and the annular frame F of the frame unit 17 is fixed by a plurality of clamps 19.

The chuck table 18 is rotatable about a vertical axis and movable in the X direction. An alignment unit (alignment means) 20 is provided above a path of movement of the chuck table 18 in the X direction. The alignment unit 20 functions to detect the division lines 13 to be laser-processed. The alignment unit 20 includes an imaging unit (imaging means) 22 for imaging the front side of the wafer 11. The imaging unit 22 has a microscope and an imaging camera. The alignment unit 20 functions to perform image processing such as pattern matching according to an image obtained by the imaging unit 22, thereby detecting the division lines 13 to be laser-processed. The image obtained by the imaging unit 22 is displayed by the display means 6.

A laser beam applying unit (processing unit) 24 is provided on the left side of the alignment unit 20 as viewed in FIG. 1. The laser beam applying unit 24 functions to apply a laser beam to the wafer 11 held on the chuck table 18. The laser beam applying unit 24 includes a casing 26, a laser beam generating unit (not shown) accommodated in the casing 26 for generating a laser beam, the laser beam generating unit having a laser oscillator, and a condensing unit 28 provided at the front end of the casing 26 for condensing the laser beam generated from the laser beam generating unit toward the wafer 11 to be laser-processed.

After performing laser processing to the wafer 11 by using the laser beam applying unit 24 at a working position where the chuck table 18 holding the wafer 11 is set directly below the condensing unit 28, the chuck table 18 is moved in the X direction to the home position shown in FIG. 1. Thereafter, the wafer 11 (the frame unit 17) is transferred from the chuck table 18 to the coating and cleaning apparatus 30 by operating a second transfer unit (second transfer means) 32. The second transfer unit 32 is provided above the coating and cleaning apparatus 30 so as to be movable in the Y direction. The second transfer unit 32 is adapted to hold the annular frame F of the frame unit 17 under suction. In the coating and cleaning apparatus 30, a cleaning water is sprayed from a cleaning nozzle included in the cleaning unit toward the wafer 11 in the condition where the wafer 11 is rotated at a low speed (e.g., 300 rpm), thereby cleaning the wafer 11.

After cleaning the wafer 11, air is blown from an air nozzle toward the wafer 11 in the condition where the wafer 11 is rotated at a high speed (e.g., 3000 rpm), thereby drying the wafer 11. Thereafter, the first transfer unit 16 is operated to hold the annular frame F of the frame unit 17 under suction and then transfer the wafer 11 from the coating and cleaning apparatus 30 to the temporary setting area 12. Thereafter, the handling unit 10 is operated to return the frame unit 17 (the wafer 11) from the temporary setting area 12 to the original position in the wafer cassette 8.

As shown in FIG. 1, the laser processing apparatus 2 includes a controller (control means) 34. The control means 34 includes a reference program storing section 36 and a reference result recording section 38. The reference program storing section 36 functions to previously store a reference program for processing a predetermined workpiece. The reference result recording section 38 functions to rate the result of alignment performed to the predetermined workpiece by the alignment unit 20 according to the reference program and then record a resultant rating point as an alignment reference result when the alignment unit 20 is not abnormal. The reference result recording section 38 also functions to rate the result of processing performed to the predetermined workpiece by the laser beam applying unit 24 according to the reference program and then record a resultant rating point as a processing reference result when the laser beam applying unit (processing means) 24 is not abnormal.

The control means 34 further includes an actual result calculating section 40 for rating the result of alignment performed to substantially the same workpiece as the predetermined workpiece by the alignment unit 20 according to the reference program and also rating the result of processing performed to substantially the same workpiece as the predetermined workpiece by the laser beam applying unit 24 according to the reference program.

In the description and claims of the present invention, the term of "substantially the same workpiece as the predetermined workpiece" is defined in the following manner. That is, substantially the same workpiece as the predetermined workpiece is defined as a workpiece having the same material, size, thickness, and processing position as those of the predetermined workpiece. In the case that the workpiece is a semiconductor wafer, substantially the same workpiece as the predetermined workpiece is a semiconductor wafer having the same material, size, thickness, and surface condition including a pattern as those of the predetermined semiconductor wafer.

The control means 34 further includes an abnormality determining section 42 for determining that the alignment unit 20 is abnormal when the result of alignment rated by the actual result calculating section 40 is lower by predetermined points than the alignment reference result and also determining that the laser beam applying unit 24 is abnormal when the result of processing rated by the actual result calculating section 40 is lower by predetermined points than the processing reference result.

Figure 3:
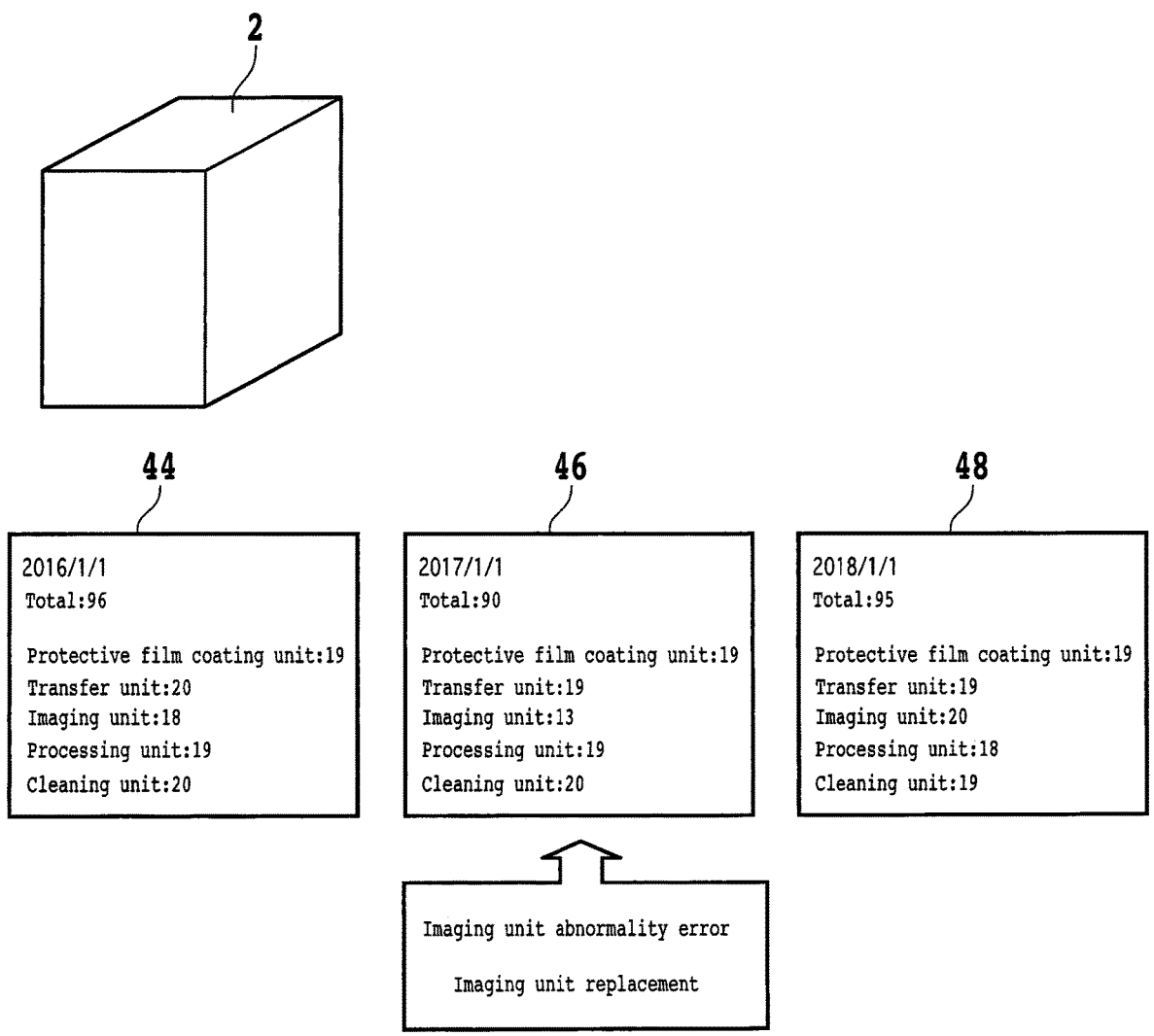
FIG. 3 is a schematic diagram showing a condition that each unit included in the same laser processing apparatus is rated on different dates.

Referring to FIG. 3, there are shown tables 44, 46, and 48 obtained by using the actual result calculating section 40 to calculate the result of processing performed by the same laser processing apparatus 2 on different dates. These tables 44 to 48 are displayed on the screen of the display means 6 by operating the operation panel 4.

The table 44 is a table obtained by rating the result of processing calculated on Jan. 1, 2016, showing that totally 96 points are obtained as the result of processing. In this case, it is determined that each unit is normal. The table 46 is a table obtained by rating the result of processing calculated on Jan. 1, 2017, showing that totally 90 points are obtained as the result of processing. In examining the table 46, the rating point for the imaging unit 22 is 13, which is lower than a reference point, so that it is determined that the imaging unit 22 has an error. Then, the operator is prompted to replace the imaging unit 22. The table 48 is a table obtained by rating the result of processing calculated on Jan. 1, 2018, showing that totally 95 points are obtained as the result of processing. Accordingly, it is determined that the laser processing apparatus 2 is normal.

There will now be described information to be recorded in each unit of the laser processing apparatus 2. In the protective film coating unit of the coating and cleaning apparatus 30, the thickness of a protective film formed on the workpiece is recorded in the case of discharging a protective film forming liquid in an amount set by the reference program and setting the rotational speed of a spinner table to a predetermined speed set by the reference program. The thickness of the protective film is measured by using the imaging unit 22 to image the front side of the wafer 11. When a protective film forming liquid nozzle is clogged, the thickness of the protective film to be formed is reduced.

In the first and second transfer units 16 and 32, the time actually required for movement of the transfer units 16 and 32 is measured in the case of moving them at a predetermined speed set by the reference program, and the time measured is rated as points. When a ball screw, air cylinder, etc. constituting each of the transfer units 16 and 32 are deteriorated, the time required for transfer is increased. In the imaging unit 22, the luminance value of each picture element constituting an image is rated as points in the case of performing the alignment to the wafer 11 held on the chuck table 18 under suction by using the contents (e.g., target pattern, target pattern position, etc.) set by the reference program. When an illumination lamp in the imaging unit 22 is deteriorated, the luminance value of the same picture element is reduced.

In the laser beam applying unit (processing unit) 24, the depth of a laser processed groove formed on the workpiece and a deviation of the laser processed groove from a hairline upon defocusing are rated as points in the case of performing ablation to the workpiece with a predetermined power and repetition frequency set by the reference program. The hairline mentioned above is a center line set in the field of view of the imaging camera in the imaging unit 22. The position of formation of the laser processed groove is rated as points according to the amount of deviation from the hairline. The depth of the laser processed groove is rated by measuring the darkness of the laser processed groove according to the image obtained by the imaging unit 22 or by changing the focal length of the microscope. Further, the amount of deviation of the laser processed groove from the hairline is measured for rating.

When a condensing lens included in the condensing unit (condenser) 28 is soiled, the defocused position of the laser beam is changed by a thermal lens effect, so that the depth of the laser processed groove is reduced. Accordingly, laser processing is performed at a plurality of defocused positions set by the reference program. When the position of the hairline is deviated in changing the defocused position, the inclination of the optical axis of the condensing lens in the condensing unit 28 can be detected.

In the cleaning unit of the coating and cleaning apparatus 30, the degree of adhesion of contaminants to the wafer 11 and the degree of remaining of the protective film on the wafer 11 are measured for rating in the case of cleaning the wafer 11 with a predetermined cleaning water amount, rotational speed of the spinner table, and moving speed of the cleaning water nozzle as set by the reference program. The wafer 11 cleaned by the cleaning unit is imaged by the imaging unit 22. Thereafter, the number of contaminants adhered to the wafer 11 is counted according to the image obtained by the imaging unit 22. Further, the degree of remaining of the protective film on the wafer 11 is detected according to the image obtained by the imaging unit 22.

In the reference result recording section 38 and the actual result calculating section 40, not only the reference result and the actual result in each unit are recorded/calculated, but also the total points in all the units are also recorded/calculated. Accordingly, not only the condition of each unit, but also the condition of the laser processing apparatus 2 can be quantitatively recognized.

Referring to FIG. 4, there are shown tables 50A, 50B, and 50C obtained by using different laser processing apparatuses 2A, 2B, and 2C, respectively, to perform laser processing to the wafer 11 on the same date and then calculate the result of processing in the actual result calculating section 40, wherein the result of processing in each unit is rated as points. In the table 50A showing the result of processing performed by the laser processing apparatus 2A, the point of each unit is 20, so that it is determined that the laser processing apparatus 2A is normal. In the table 50C showing the result of processing performed by the laser processing apparatus 2C, each point of the protective film coating unit and the processing unit is 21, and the point of each of the other units is 20, so that it is determined that the laser processing apparatus 2C is also normal.

On the other hand, in the table 50B showing the result of processing performed by the laser processing apparatus 2B, the point of the imaging unit is 18, so that it is determined that the alignment accuracy is insufficient. In this case, the laser processing apparatus 2B including the imaging unit rated as a low point is not used in processing such a kind of wafer having large variations in individual patterns or having complex patterns. In this manner, a laser processing apparatus rated as a low point is not used in processing such a kind of wafer that high-precision processing is required.

There will now be described a specific rating method for each unit.

(Imaging Unit)

A target correlation value is rated for the imaging unit 22 in the following manner. A plurality of predetermined positions on the wafer previously stored in the reference program are imaged by the imaging unit 22. The images obtained are then subjected to pattern matching according to alignment targets #1, #2, and #3 previously stored in the reference program, thereby obtaining correlation values with respect to these alignment targets #1, #2, and #3. Then, the correlation value with respect to each alignment target is rated as points. In this case, the higher the correlation value, the higher the rating point.

Correlation value with respect to the alignment target #1:
greater than 90: 20 points
90 or less: 18 points
80 or less: 14 points
70 or less: 10 points
60 or less: 2 points
50 or less: 0 point Correlation value with respect to the alignment target #2:
greater than 90: 20 points
90 or less: 18 points
80 or less: 14 points
70 or less: 10 points
60 or less: 2 points
50 or less: 0 point Correlation value with respect to the alignment target #3:
greater than 90: 20 points
90 or less: 18 points
80 or less: 14 points
70 or less: 10 points
60 or less: 2 points
50 or less: 0 point The luminance of each picture element in a target image is rated in the following manner. The alignment target #1 is imaged by the imaging unit 22 with a light quantity previously stored in the reference program, and the luminance of each picture element in the image of the alignment target #1 as obtained by the imaging unit 22 is then rated as minus points. The luminance for the alignment target #2 and the alignment target #3 is also rated in a similar manner.

For example, when the alignment unit 20 is normal, the alignment target #1 is imaged with a light quantity of 70%. In this case, it is assumed that the luminance of a picture element A-1 in the image of the alignment target #1 as obtained above is 125 (reference value). In the case that the luminance detected is greater than 130, an error is determined and this rating is interrupted. In the case that the luminance detected is 130 or less, the rating point is −0. This rating is similarly performed for all of the other picture elements in the image.

Luminance of the picture element A-1 in the image of the alignment target #1:
(reference value+5) or less: −0 point
(reference value−5) or less: −2 points
(reference value−10) or less: −4 points
(reference value−15) or less: −6 points
(reference value−20) or less: −8 points
(reference value−25) or less: −10 points The luminance of each picture element in an image obtained by imaging a mirror surface is also rated in the following manner. That is, a specific area of the wafer (an area of the front side of the wafer where no patterns are formed) is imaged with a light quantity of 100%. In this case, the luminance of the picture element A-1 in the image obtained above is rated as minus points. This rating is similarly performed for all of the other picture elements in the image.

Luminance of the picture element A-1:
255: 0 point
127 or less: −20 points
245 or less: −50 points
(Laser Beam Applying Unit as Processing Unit)
Deviation from the hairline:
zero: 20 points
±2 μm or less: 18 points
±4 μm or less: 14 points
±6 μm or less: 10 points
±8 μm or less: 2 points
greater than ±8 μm: 0 point
Depth of the groove:
set value: 20 points
deviation from the set value:
  ±2 μm or less: 18 points
  ±4 μm or less: 14 points
  ±6 μm or less: 10 points
  ±8 μm or less: 2 points
  greater than ±8 μm: 0 point
(Transfer Unit)

The air cylinder and the ball screw constituting each transfer unit are evaluated in the following manner. That is, a deviation of actual transfer time from predetermined transfer time previously set is measured and rated as follows:

Error from the set transfer time:
±1%: 20 points
±2% or less: 18 points
±4% or less: 14 points
±6% or less: 10 points
±8% or less: 2 points
greater than ±8%: 0 point
(Protective Film Coating Unit)

An error between the actual thickness of the protective film and the reference thickness (reference value) obtained under the reference conditions is measured and rated as follows:

±5 μm or less: 10 points
±10 μm or less: 7 points
±15 μm or less: 3 points
greater than ±15 μm: 0 point
(Cleaning Unit)

The wafer is imaged at the same position before cleaning and after cleaning under the reference conditions, and the number of contaminants adhering to the wafer is automatically counted on the image and then rated as follows:

0 to 10: 25 points
11 to 30: 20 points
31 to 50: 15 points
51 to 70: 10 points
71 to 90: 5 points
91 or greater: 0 point The wafer is imaged at the same position before coating, after coating and before cleaning, and after cleaning under the reference conditions. Thereafter, the height of the upper surface of the wafer is detected from the depth of focus of the microscope before coating, after coating and before cleaning, and after cleaning.

Then, the remaining amount of the protective film after cleaning is calculated from the height of the upper surface of the wafer detected above, and the remaining amount calculated is rated as follows:

5 μm or less: −10 points
greater than 5 μm: −50 points

While the essential part of the present invention for rating the performance of each unit as points is applied to a laser processing apparatus in the above preferred embodiment, the processing apparatus according to the present invention is not limited to a laser processing apparatus, but the essential part of the present invention is similarly applicable also to any other processing apparatuses such as a cutting apparatus and a grinding apparatus.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A processing method for processing a workpiece by using a processing apparatus including processing means for processing said workpiece having one or more processing units, alignment means having one or more alignment units including an imaging camera for performing alignment to said workpiece to be processed by said processing means, and control means for controlling said processing means and said alignment means, said processing method comprising:
    preparing a predetermined workpiece;
    storing a reference program for processing said predetermined workpiece by using said processing apparatus;
    rating the result of alignment performed to said predetermined workpiece by said alignment means according to said reference program and then recording a resultant rating point as an alignment reference result when said alignment means is not abnormal, and rating the result of processing performed to said predetermined workpiece by said processing means according to said reference program and then recording a resultant rating point as a processing reference result when said processing means is not abnormal;
    performing alignment to a workpiece which is substantially the same workpiece as the predetermined workpiece according to said reference program by using said alignment means and performing processing to the workpiece which is substantially the same workpiece as the predetermined workpiece according to said reference program by using said processing means, after preparing the predetermined workpiece, storing the reference program, recording the alignment reference result and recording the processing reference result; and
    rating the result of alignment performed to the workpiece which is substantially the same workpiece as the predetermined workpiece and rating the result of processing performed to the workpiece which is substantially the same workpiece as the predetermined workpiece,
    determining that at least one alignment unit in said alignment means is abnormal when the result of alignment rated is lower by predetermined points than at least one alignment unit in said alignment reference result and identifying the at least one abnormal alignment unit;

determining that at least one processing unit in said processing means is abnormal when the result of processing rated is lower by predetermined points than at least one unit said processing reference result and identifying the at least one abnormal processing unit; and performing maintenance or parts replacement on the at least one identified abnormal alignment unit or the at least one identified abnormal processing unit;

wherein determining that at least one alignment unit in said alignment means is abnormal comprises;

evaluating a plurality of predetermined positions on the workpiece compared to the predetermined workpiece by obtaining an image of the workpiece, matching the predetermined positions on the workpiece with the predetermined positions on the predetermined workpiece, and assigning a correlation value to the matched predetermined positions on the workpiece;

wherein determining that at least one processing unit in said processing means is abnormal comprises:

evaluating a luminance of a picture element in an image of an alignment target compared to the predetermined workpiece comprising an image of the picture element on the workpiece, comparing a luminance of the image of the picture element with a luminance of a picture element on the predetermined workpiece, and assigning a value to the luminance of the picture elements;

evaluating deviance from a hairline compared to the predetermined workpiece comprising measuring deviation from the hairline on the workpiece, and assigning a value to the measured deviation;

evaluating a depth of a groove compared to the predetermined workpiece comprising measuring the depth of a groove on the workpiece, and assigning a value to the measured depth;

evaluating deviance of a thickness of a protective film compared to the predetermined workpiece comprising measuring a thickness of the protective film on the workpiece, comparing the measured thickness to a reference thickness, and assigning a value to a difference in the measured thickness;

evaluating a number of contaminants adhering to the workpiece compared to the predetermined workpiece comprising imaging a position on the workpiece before cleaning and imaging the position after cleaning, and counting the number of contaminants after cleaning;

evaluating a remaining amount of protective film compared to the predetermined workpiece comprising imaging a position on the workpiece before coating and imaging the position after coating, imaging the position after coating and before cleaning, and imaging the position after cleaning, determining a height of an upper surface of the workpiece before coating, after coating and before cleaning, and after cleaning, and determining the remaining amount from the height of the workpiece after coating and before cleaning and the height of the workpiece after cleaning; and evaluating deviance of actual transfer time compared to the predetermined workpiece comprising measuring the actual transfer time, comparing the measured transfer time to a predetermined transfer time, and assigning a value to a difference in the measured transfer time.

2. The processing method of claim 1 wherein performing maintenance or parts replacement on the at least one identified abnormal processing unit comprises performing maintenance or parts replacement on one or more of:

a protective film coating apparatus;
a first transfer unit;
an imaging unit;
a second transfer unit;
a processing unit; or
a cleaning unit.

3. The processing method of claim 1 wherein performing maintenance or parts replacement comprises performing maintenance or parts replacement on the at least one identified abnormal alignment unit.

4. The processing method of claim 1 wherein performing maintenance or parts replacement comprises performing maintenance or parts replacement on the at least one identified abnormal processing unit.

* * * * *